United States Patent
Bernbach

[15] 3,652,120
[45] Mar. 28, 1972

[54] CHILD RESTRAINING GATE FOR AUTOMOBILES

[72] Inventor: Jeffrey M. Bernbach, 300 Central Ave., Hartsdale, N.Y. 10530

[22] Filed: Mar. 23, 1970

[21] Appl. No.: 21,780

[52] U.S. Cl..............................................296/24
[51] Int. Cl........................................B60r 21/02
[58] Field of Search....................280/179, 150; 296/24, 1

[56] References Cited

UNITED STATES PATENTS

| 3,044,800 | 7/1962 | Wicker | 296/24 X |
| 3,441,309 | 4/1969 | Halstead | 296/24 |
| 3,510,164 | 5/1970 | Setina | 296/24 |

Primary Examiner—Philip Goodman
Attorney—Brumbaugh, Graves, Donohue & Raymond

[57] ABSTRACT

A child-restraining gate adapted to fit along the front edge of the rear seat of an automobile to form the front side of a crib-like enclosure, the gate being adjustable in size to accommodate automobiles having different interior widths.

7 Claims, 14 Drawing Figures

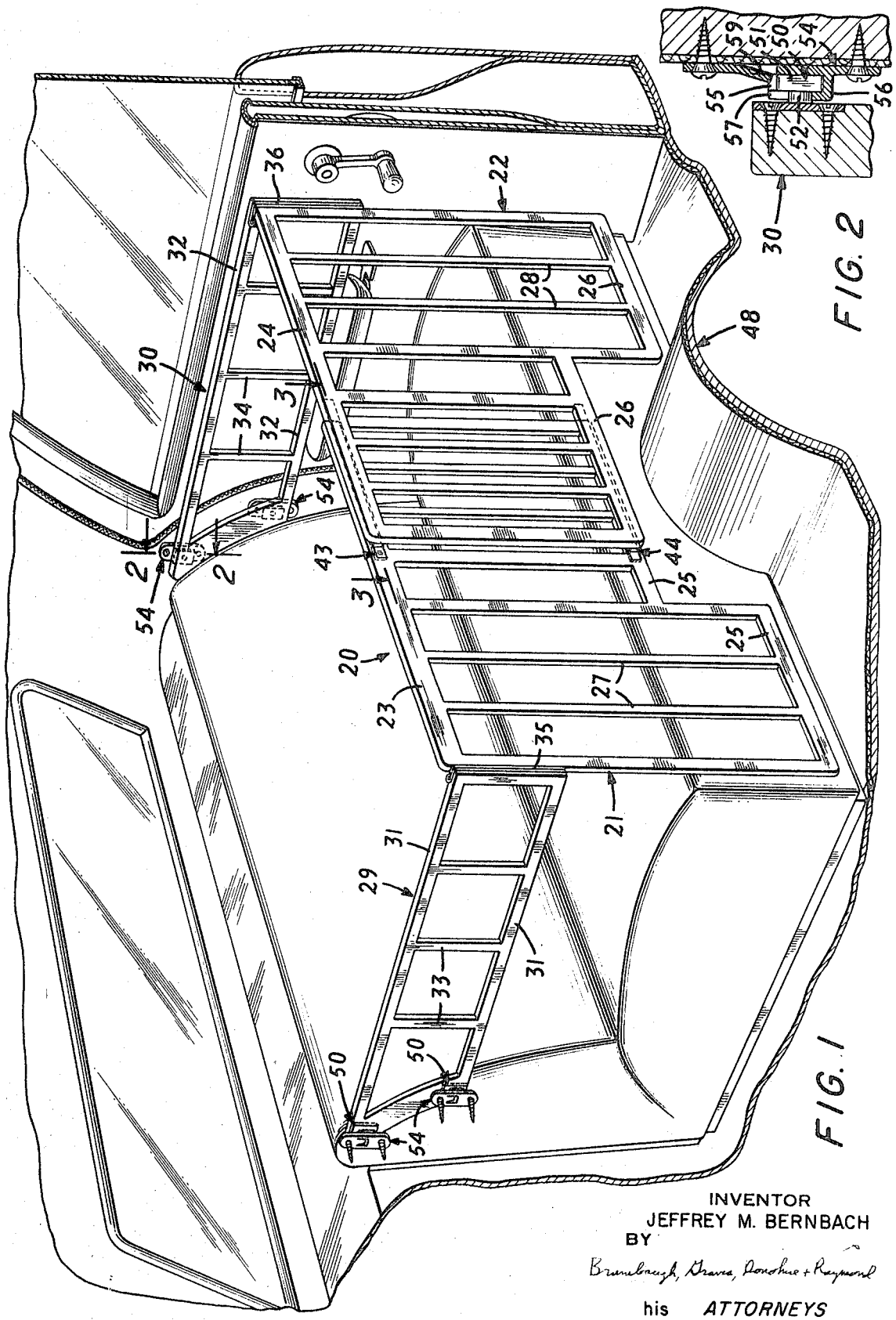

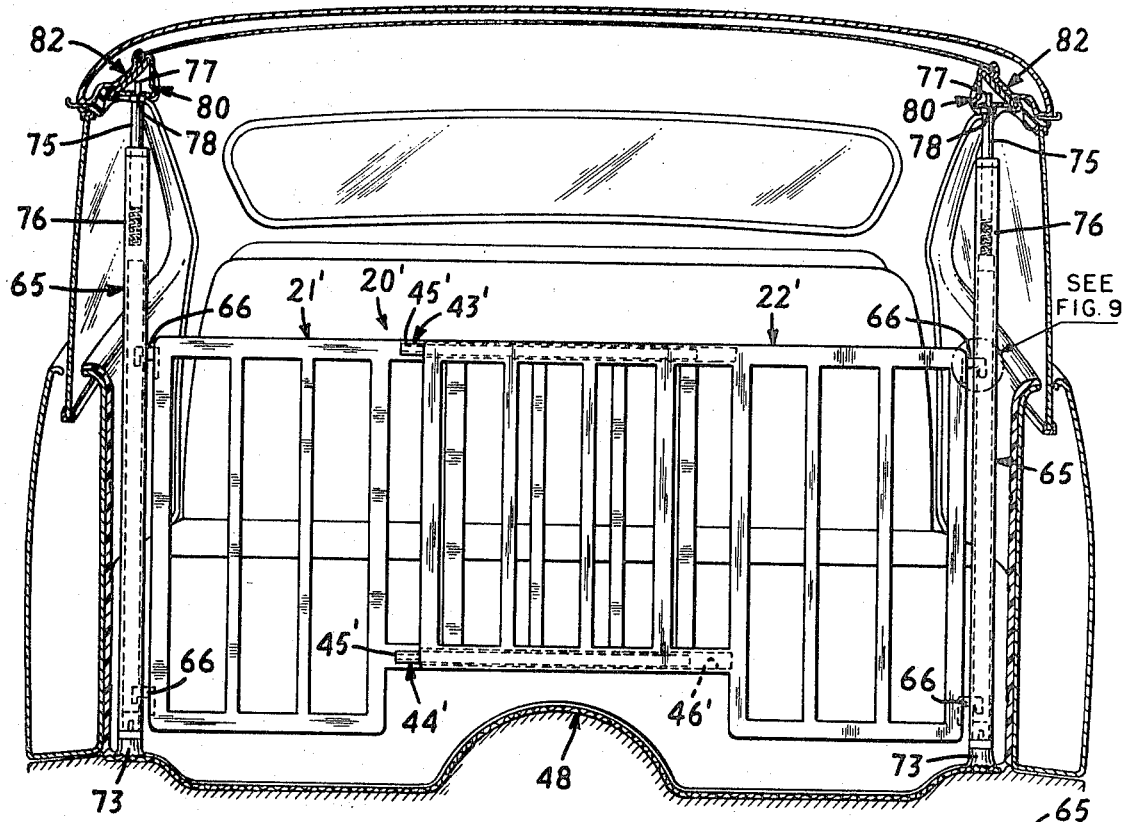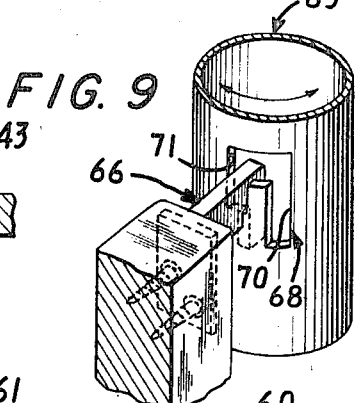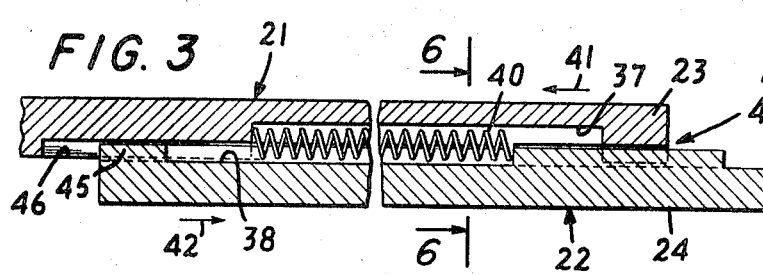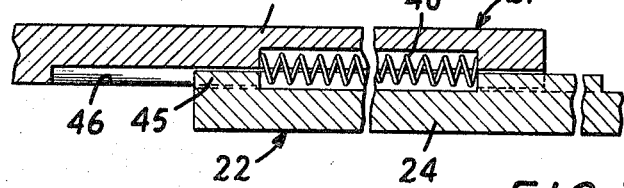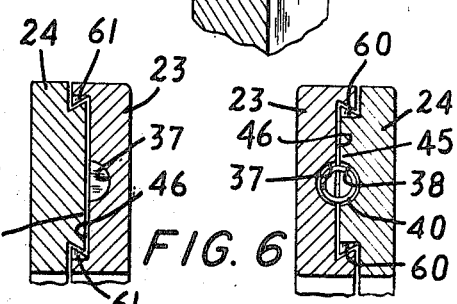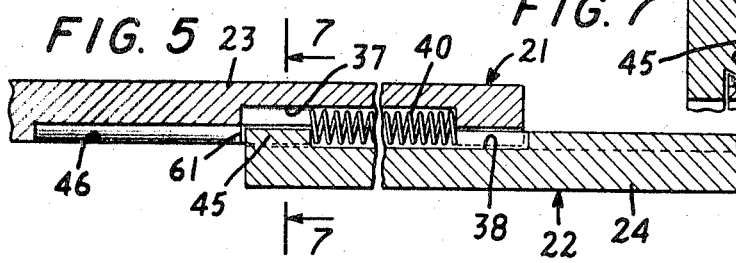

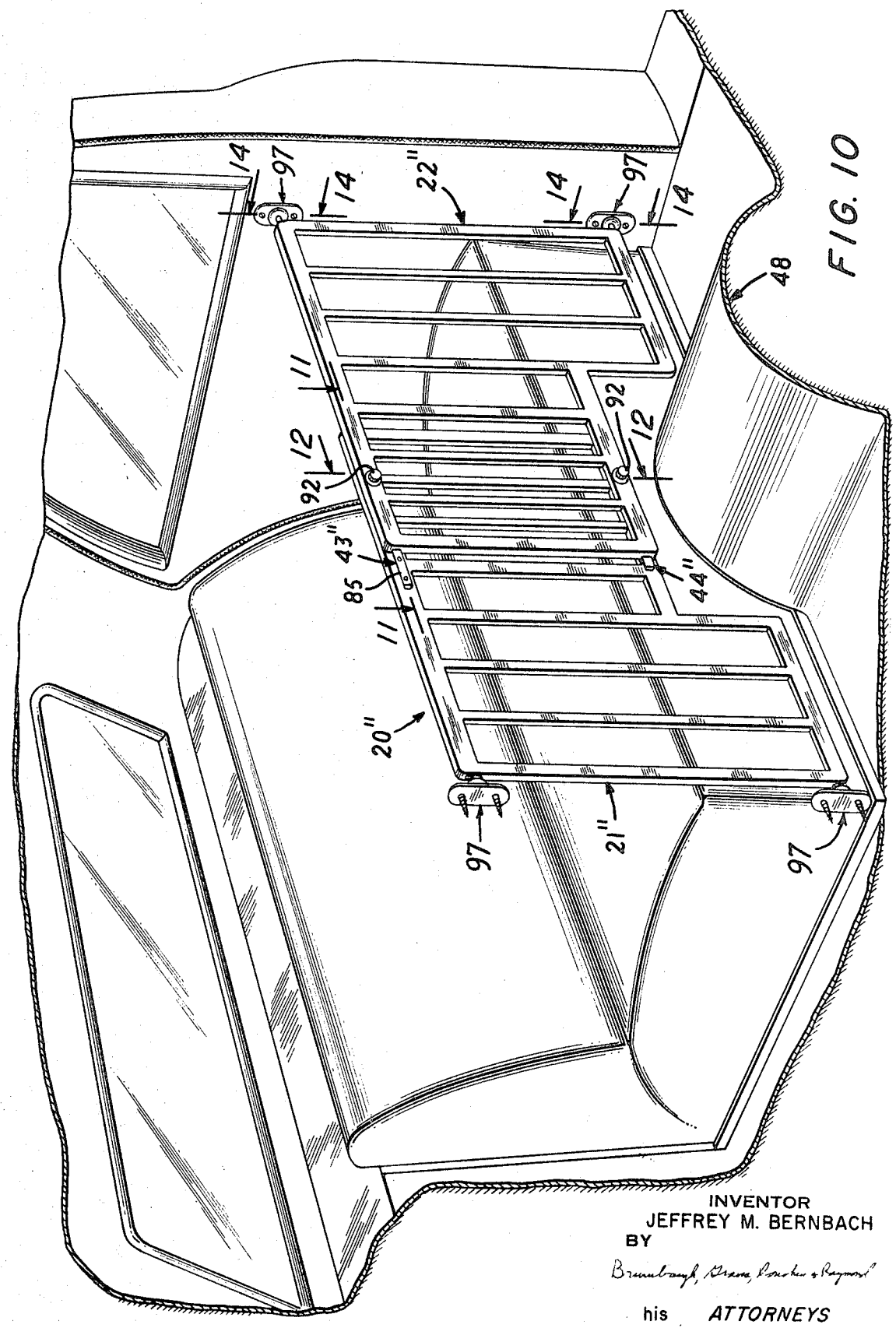

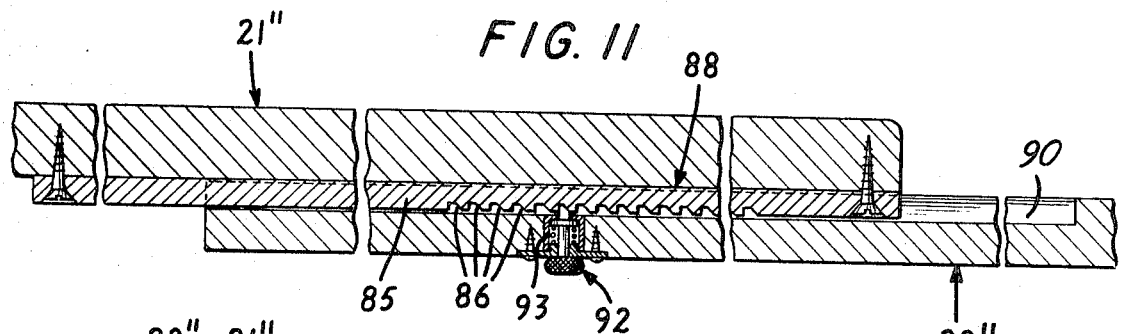
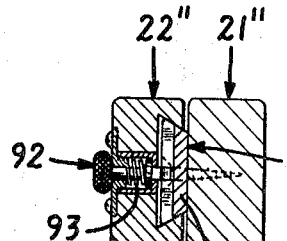
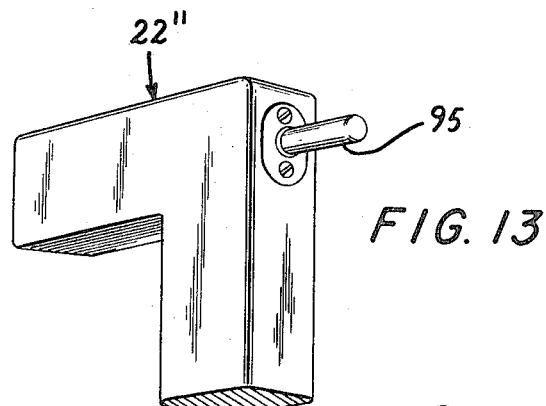
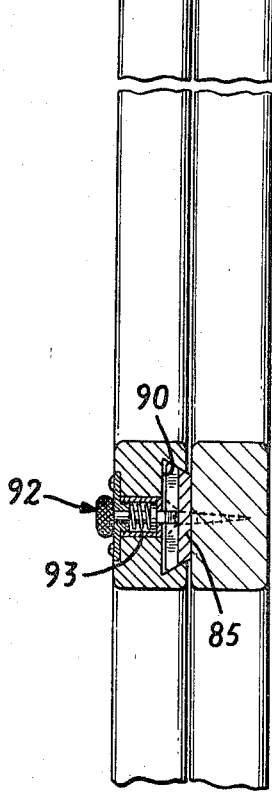
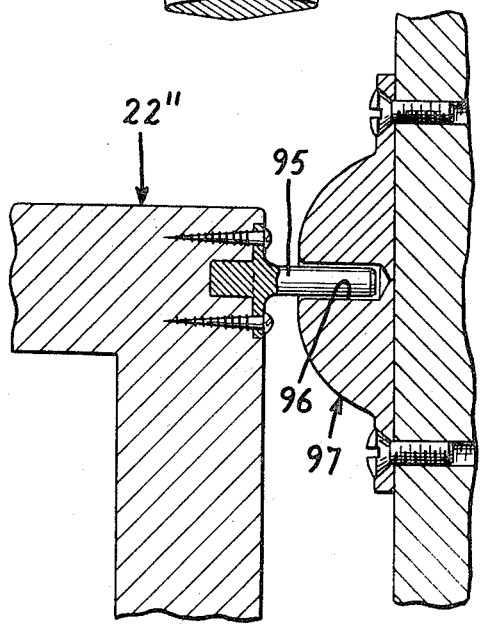

CHILD RESTRAINING GATE FOR AUTOMOBILES

The present invention relates to automobile safety devices and particularly to a novel child-restraining gate adapted to fit along the rear seat of an automobile, thereby providing a criblike enclosure for a baby or young child.

BACKGROUND OF THE INVENTION

Devices such as seatbelts, shoulder harnesses, etc., presently used in automobiles to restrain the occupants when accidents or abrupt stops occur are unsuitable for infants and young children. It is widely recognized that young children cannot remain upright and in one position for any length of time; thus conventional restraining devices are useless. Even so, safety devices have not been provided for infants or small children.

SUMMARY OF THE INVENTION

Accordingly, it is the object of the present invention to afford infants and young children a reasonable measure of protection while riding in automobiles by converting the rear seat area of an automobile into a criblike enclosure in which a child may freely and safely move about.

This and other objects are accomplished by utilizing a gate which will form the front side of the crib structure while the back of the rear seat and the interior sides of the car form the remaining sides of the structure. The gate comprises two members mounted together for relative movement therebetween, thereby enabling the gate to be lengthened or shortened in order to accommodate the various interior widths found in automobiles. The bottom of this gate is shaped so that it can fit over the transmission hump in the floor of the rear seat area.

Further objects and advantages of the invention will be apparent from a reading of the following detailed description thereof taken in conjunction with the following drawings.

BRIEF DESCRIPTION OF THE DRAWINGS

FIG. 1 is a perspective view of a child-restraining gate according to the present invention;

FIG. 2 is an enlarged sectional view taken along the line 2—2 of FIG. 1, depicting the structure for mounting the gate in an automobile;

FIG. 3 is an enlarged sectional view taken along the line 3—3 of FIG. 1 and looking in the direction of the arrows, showing a spring arrangement for biasing the two gate members against the sides of the automobile;

FIGS. 4 and 5 are similar to FIG. 3, and show the spring in various stages of compression;

FIG. 6 is a sectional view taken along the line 6—6 of FIG. 3 and looking in the direction of the arrows;

FIG. 7 is a sectional view taken along the line 7—7 of FIG. 5 and looking in the direction of the arrows;

FIG. 8 is an elevational view of another embodiment of the invention;

FIG. 9 is an enlarged perspective view of the structure for mounting the gate of FIG. 8 in an automobile;

FIG. 10 is a view in perspective of another embodiment of the invention;

FIG. 11 is an enlarged sectional view taken along the line 11—11 of FIG. 10 and looking in the direction of the arrows, depicting a ratchet-style locking means;

FIG. 12 is an enlarged sectional view taken along the line 12—12 of FIG. 10 and looking in the direction of the arrows;

FIG. 13 is an enlarged perspective view of one of the corners of the gate of FIG. 10, depicting the male mounting member attached thereto; and FIG. 14 is an enlarged sectional view taken along the line 14—14 of FIG. 10, illustrating the male mounting member engaged with a female mounting member which is attached to the side of the automobile.

DESCRIPTION OF THE PREFERRED EMBODIMENTS

In the illustrative embodiment of the invention shown in FIGS. 1–7, a child-restraining gate 20 comprises two front wall sections 21 and 22, having top and bottom horizontal members 23, 24 and 25, 26 which are connected by a plurality of vertical members 27 and 28, respectively. A pair of sidewall sections 29 and 30, comprising two horizontal members 31 and 32 connected by a plurality of vertical members 33 and 34, are attached by a pair of hinges 35 and 36 to the outside vertical members of the front wall sections 21 and 22, respectively. This arrangement permits the front wall sections to be extended so that the sidewall sections abut the interior sidewalls (or the rear doors) of the automobile. In addition, when the gate 20 is removed from the automobile, it may conveniently be folded flat to facilitate handling and to minimize the storage space required.

Referring more particularly to FIGS. 3–7, the adjacent faces of the horizontal members 23, 25 and 24, 26 are formed with recesses 37 and 38, respectively, to receive a corresponding compression spring 40 that automatically adjusts the gate to accommodate the interior width of the car. In particular, the opposite ends of the spring 40 engage the opposite lateral walls of the recesses 37 and 38, driving the gate sections 21 and 22 in the directions indicated by the arrows 41 and 42 (see FIG. 3), respectively, to expand the front wall portion of the gate 20 until the sidewalls 29 and 30 are driven against the interior sides of the automobile.

The gate sections 21 and 22 are slidably connected together by tongue and groove couplings 43 and 44 formed between the horizontal members 23, 24 and 25, 26, respectively. In particular, the coupling 43 comprises a dovetailed rib 45 extending from the horizontal member 24, the rib 45 being received in a mating dovetailed groove 46 formed in the horizontal member 23. The lower center portion of the front wall of the gate is shaped to fit over the transmission shaft hump 48 for all relative positions of the gate sections 21 and 22.

The gate 20 is secured in the automobile by a pair of spaced male mounting members 50 (see also FIG. 2) which are attached to the ends of the sidewall sections 29 and 30 remote from the hinges 35 and 36. The mounting members 50 include a laterally extending head portion head portion 51 which is spaced from the respective sidewall section by a pin 52 of reduced width. The male mounting members 50 are received in corresponding female mounting members 54 which are secured to the interior automobile walls. The mounting members 54 are formed with an upwardly facing cavity 55 adapted to receive the head 51 of the male member 50. The cavity 55 is closed by an outside wall 56 which is formed with an upwardly extending slot 57 to receive the pin 52 of the male member 50.

The gate 20 is conveniently mounted in the automobile by dropping the heads 51 into the cavities 55. The gate is locked in position by a flexible retaining latch 59 of spring steel, for example, which normally extends from each female member 54 as illustrated in FIG. 2 to prevent the mounting members 50 and 54 from being inadvertently separated. When the gate is to be removed, one need only depress the two latches 59 on one side of the car and lift the corresponding one of the sidewall sections 29 and 30. Inasmuch as the two mounting structures are spaced as illustrated, an adult must use both hands to free one of the sidewall sections, and so it is impossible for an infant to remove or even loosen the gate. In addition, the spaced mounting structures provide rigidity to the gate.

FIG. 4 illustrates the equilibrium positions of gate sections 21 and 22, that is, the positions the gate sections assume when the gate is removed from the automobile. Here the spring 40 is expanded to the maximum extent, which occurs when the lateral walls of the recesses 37 and 38 are in registry with each other. It will be noticed that the gate sections 21 and 22 will not fly apart, even though the spring biases the gate sections outwardly against the automobile walls when the gate is mounted in the automobile.

If it is desired to separate the gate sections 21 and 22 from each other, in order to store the gate in a more compact package or to replace the spring 40, for example, the gate sections are pulled apart against the force of the spring until the relative positions illustrated in FIG. 5 are reached. The gate sections then may be separated by moving them laterally away from each other, inasmuch as the outwardly diverging portions of the dovetailed rib 45 are relieved at 60 (see FIG. 6) over the right-hand portion of the common or overlapping zone of the rib 45 and the groove 46 as viewed in FIG. 5. Similarly, the inwardly converging portions of the dovetailed groove 46 are relieved at 61 (see FIG. 7) over the left-hand portion of the overlapping sections of the groove 46 and the rib 45 as viewed in FIG. 5. Thus, over the entire common zone containing adjacent facing portions of the rib 45 and groove 46 illustrated in FIG. 5, either the rib or the sidewalls of the groove are relieved, so that the gate sections 21 and 22 may be laterally separated from (or if disassembled, after installing the spring 40, they may be placed together to) the positions shown in FIG. 5.

By placing the mounting units at the free ends of the sidewall sections 29 and 30, the gate 20 is not disturbed if either one of the rear doors is opened. Also, an infant on the rear seat within the gate is prevented by the sidewall sections from falling out of the car when a rear door is opened. Of course, the gate illustrated in FIGS. 1-7 may also be used in two-door automobile models.

In another embodiment of the invention shown in FIG. 8 and 9, the gate 20' includes two front wall sections 21' and 22' similar to the corresponding portions of the gate shown in FIG. 1. As in the first embodiment, the gate sections 21' and 22' are slidably connected together by tongue and groove couplings 43' and 44' each comprising a dovetailed rib 45' (extending, however, from the gate section 21') which is received in a mating dovetailed groove 46' formed in the gate section 22'. In the embodiment of FIGS. 8 and 9, however, there are no biasing springs for urging the gate sections outwardly against the interior sidewalls of the automobile. The gate sections are connected to a pair of vertical mounting legs 65 by means of four hook-shaped fasteners 66 secured to the four outer corners of the front wall sections 21' and 22'. The four hooks 66 are received in four corresponding cutouts 68 (seen best in FIG. 9) formed in the mounting legs 65. Each cutout 68 includes a relatively long vertical slot 70 through which the entire hook 66 may be inserted. Then by rotating the mounting leg 65, the hook drops into a relatively short vertical slot 71 through which the hook cannot be radially withdrawn from the mounting leg.

The two mounting legs 65 are installed at opposite sides of the car so that the gate 20' abuts the front edge of the rear seat. Each mounting leg includes a foot 73 rotatably mounted thereon, the foot having a lower irregular or rough surface adapted to frictionally engage the car floor. Alternatively, the foot may have a pin extending therefrom which is received in a hole formed in a plate secured to the car floor. The upper end of each mounting leg includes a plunger 75 biased outwardly by a spring 76, the plunger carrying a pin 77 which is received in a hole 78 formed in a spring clip 80. The spring clip may be snapped over the trim 82 located over the rear window, or the clip may be fastened to the roof by screws, for example.

Still another embodiment of the invention is illustrated in FIGS. 10-14. Here the gate 20" includes the two front wall sections 21" and 22", which are slidably connected together by tongue and groove arrangements 43" and 44" as before. There are no springs to drive the gate sections 21" and 22" against the sides of the car. Rather, each dovetailed rib 85 mounted on the gate section 21" is formed with a plurality of inclined notches 86 arranged to form a ratchet 88. The gate section 22", which is formed with dovetailed grooves 90 to receive the ribs 85, mounts a pair of locking pins 92, each of which is biased by a spring 93 into engagement with the ratchet 88.

Each of the outer corners of the gate sections 21" and 22" carries a pin 95, which is received in a bore 96 formed in a corresponding female mounting member 97 secured to the interior sidewall of the car at a location such that the gate 20" abuts the front edge of the rear seat.

The gate 20" is readily installed in an automobile merely by expanding the gate sections 21" and 22" while guiding the pins 95 into the corresponding bores 96. When the pins are fully seated in the bores, the gate is securely mounted, since the locking pins 92 engage the ratchets 88 and prevent the gate from being disengaged from the female mounting members 97. In order to remove the gate, the two pins 92 are withdrawn while sliding the gate sections together. It is apparent that an infant would be unable to reach through the gate and simultaneously withdraw the two pins 92. While the gate 20" is illustrated in a two-door automobile, it could also be used in a four-door version, although the gate would have to be re-installed if a rear door were opened.

While the fundamental novel features of the invention have been shown and described, it will be understood that various substitutions, changes and modifications in the form and details of the apparatus illustrated may be made by those skilled in the art without departing from the spirit of the invention. For example, the spring-biased connection between the gate sections shown in FIGS. 1-7 and the ratchet arrangement of FIGS. 10-12 may each be used with any of the other embodiments. Also, one or more pads or cushions may be secured to the interior sides of the gate to prevent possible injury to the infant should it be thrown against the gate. Alternatively, the intermediate vertical members of the gate sections may be replaced by the plastic "fish net" structure often used in a child's playpen, the "fish net" being supported by the horizontal members and the vertical members at the periphery of each gate section. Accordingly, all such modifications and variations are included within the intended scope of the invention as defined by the following claims.

I claim:

1. A child-restraining gate adapted to be installed against the front edge of the rear seat of an automobile to form the front side of a criblike enclosure defined also by the back of the rear seat and interior sides of the automobile, comprising two gate sections slidably connected together for relative movement therebetween to provide an expandable gate capable of accommodating automobiles having various interior widths, the gate being secured to the interior of the automobile so that the gate abuts the front edge of the rear seat, a sidewall section hingedly secured to the outer lateral edge of each gate section to permit the sidewall section to extend rearwardly therefrom, male mounting means extending from the ends of the sidewall sections remote from the gate sections, and female mounting means adapted to be secured to the interior sides of the automobile for receiving the male mounting means.

2. A child-restraining gate according to claim 1, wherein the gate sections extend along the front of the rear seat and are formed to receive the transmission shaft hump in the floor of the rear seat area.

3. A child-restraining gate according to claim 1, wherein the gate sections include spaced top and bottom horizontal members which support child-restraining elements connected therebetween.

4. A child-restraining gate according to claim 3, wherein the adjacent horizontal members of the gate sections are formed with interengaging tongues and grooves so as to permit parallel movement of the gate sections to lengthen and shorten the gate.

5. A child-restraining gate according to claim 1, including spring means for extending the gate by biasing the gate sections against the sidewalls of the automobile.

6. A child-restraining gate adapted to be installed against the front edge of the rear seat of an automobile to form the front side of a criblike enclosure defined also by the back of the rear seat and interior sides of the automobile, comprising two gate sections slidably connected together for relative movement therebetween to provide an expandable gate capable of accommodating automobiles having various interior widths, the gate being secured to the interior of the automobile so that the gate abuts the front edge of the rear seat, a sidewall section secured to the outer lateral edge of each gate section to permit the sidewall section to extend rearwardly therefrom, male mounting means extending from the ends of the sidewall sections remote from the gate sections, and female mounting means adapted to be secured to the interior sides of the automobile for receiving the male mounting means.

7. A child-restraining gate adapted to be installed against the front edge of the rear seat of an automobile to form the front side of a criblike enclosure defined also by the back of the rear seat and interior sides of the automobile, comprising two gate sections slidably connected together for relative movement therebetween to provide an expandable gate capable of accommodating automobiles having various interior widths, the gate being secured to the interior of the automobile so that the gate abuts the front edge of the rear seat, a sidewall section secured to the outer lateral edge of each gate section so as to extend along the interior sides of the automobile, male mounting means extending from the ends of the sidewall sections remote from the gate sections, and female mounting means adapted to be secured to the interior sides of the automobile for receiving the male mounting means.

* * * * *